US011551678B2

(12) United States Patent
Bromand et al.

(10) Patent No.: US 11,551,678 B2
(45) Date of Patent: *Jan. 10, 2023

(54) SYSTEMS AND METHODS FOR GENERATING A CLEANED VERSION OF AMBIENT SOUND

(71) Applicant: Spotify AB, Stockholm (SE)

(72) Inventors: Daniel Bromand, Boston, MA (US); Richard Mitic, Stockholm (SE); Björn E. Roth, Stockholm (SE)

(73) Assignee: Spotify AB, Stockholm (SE)

( * ) Notice: Subject to any disclaimer, the term of this patent is extended or adjusted under 35 U.S.C. 154(b) by 7 days.

This patent is subject to a terminal disclaimer.

(21) Appl. No.: 17/375,962

(22) Filed: Jul. 14, 2021

(65) Prior Publication Data

US 2021/0343278 A1 Nov. 4, 2021

Related U.S. Application Data

(63) Continuation of application No. 16/557,734, filed on Aug. 3, 2019, now Pat. No. 11,094,319.

(51) Int. Cl.
*G10L 15/20* (2006.01)
*G06F 3/16* (2006.01)
(Continued)

(52) U.S. Cl.
CPC .............. *G10L 15/20* (2013.01); *G06F 3/165* (2013.01); *G10L 15/22* (2013.01); *G10L 25/84* (2013.01); *G10L 2015/223* (2013.01)

(58) Field of Classification Search
CPC ......... G10L 15/20; G10L 15/22; G10L 25/84; G10L 2015/223; G06F 3/165
See application file for complete search history.

(56) References Cited

U.S. PATENT DOCUMENTS 9,153,239 B1 10/2015 Postelnicu et al.
9,319,782 B1 4/2016 Crump et al.
(Continued)

FOREIGN PATENT DOCUMENTS

CN 108847219 A 11/2018
CN 109286875 A 1/2019
(Continued)

OTHER PUBLICATIONS

Bingham, "A fast fixed-point algorithm for independent component analysis of complex valued signals," Neural Networks Research Centre, Helsinki University of Technology, Finland, Jan. 19, 2000, 16 pgs.

(Continued)

*Primary Examiner* — Mohammad K Islam
(74) *Attorney, Agent, or Firm* — Morgan, Lewis & Bockius LLP (57) ABSTRACT

A first electronic device is provided. While a media content item provided by a media-providing service is emitted by a second electronic device that is remote from the first electronic device, the first electronic device receives, from the media-providing service, data that includes an audio stream that corresponds to the media content item. The first electronic device detects ambient sound that includes sound corresponding to the media content item emitted by the second electronic device. The first electronic device generates a cleaned version of the ambient sound, which includes: using the data received from the media-providing service to align the audio stream with the ambient sound; and performing a subtraction operation to subtract the audio stream from the ambient sound. The first electronic device detects a voice command in the cleaned version of the ambient sound.

20 Claims, 7 Drawing Sheets

(51) Int. Cl.
  *G10L 15/22* (2006.01)
  *G10L 25/84* (2013.01)

(56) References Cited

U.S. PATENT DOCUMENTS

| | | |
|---|---|---|
| 9,361,885 B2 | 6/2016 | Ganong |
| 9,431,021 B1 | 8/2016 | Scalise et al. |
| 9,443,527 B1 | 9/2016 | Watanabe |
| 9,640,179 B1* | 5/2017 | Hart .................. G10L 15/20 |
| 9,684,715 B1 | 6/2017 | Ross et al. |
| 9,734,845 B1 | 8/2017 | Liu et al. |
| 9,779,732 B2 | 10/2017 | Lee |
| 9,779,734 B2 | 10/2017 | Lee |
| 9,794,710 B1* | 10/2017 | Sheen .................. G06F 3/162 |
| 9,805,733 B2 | 10/2017 | Park |
| 9,916,839 B1 | 3/2018 | Scalise et al. |
| 9,940,949 B1 | 4/2018 | Vitaladevuni et al. |
| 9,947,333 B1 | 4/2018 | David |
| 10,074,371 B1 | 9/2018 | Wang et al. |
| 10,134,388 B1 | 11/2018 | Lilly |
| 10,186,266 B1 | 1/2019 | Devaraj |
| 10,192,546 B1 | 1/2019 | Piersol et al. |
| 10,229,680 B1 | 3/2019 | Gillespie |
| 10,283,116 B2 | 5/2019 | Ko et al. |
| 10,297,266 B1 | 5/2019 | Burenius et al. |
| 10,304,475 B1 | 5/2019 | Wang et al. |
| 10,339,957 B1 | 7/2019 | Chenier |
| 10,365,887 B1 | 7/2019 | Mulherkar |
| 10,438,591 B1 | 10/2019 | Sharifi |
| 10,445,365 B2 | 10/2019 | Luke |
| 10,515,625 B1 | 12/2019 | Metallinou |
| 10,573,312 B1 | 2/2020 | Thomson |
| 10,600,406 B1 | 3/2020 | Shapiro |
| 10,623,811 B1 | 4/2020 | Cwlk |
| 10,643,609 B1 | 5/2020 | Pogue |
| 10,685,669 B1 | 6/2020 | Lan |
| 10,706,843 B1 | 7/2020 | Elangovan |
| 10,728,196 B2 | 7/2020 | Wang |
| 10,847,149 B1 | 11/2020 | Mok |
| 10,867,596 B2 | 12/2020 | Yoneda |
| 10,878,826 B2 | 12/2020 | Li |
| 2001/0003173 A1 | 6/2001 | Lim |
| 2004/0128135 A1 | 7/2004 | Anastasakos |
| 2006/0206340 A1 | 9/2006 | Silvera |
| 2011/0046952 A1 | 2/2011 | Koshinaka |
| 2011/0131032 A1 | 6/2011 | Yang |
| 2012/0011105 A1 | 1/2012 | Brock |
| 2013/0013315 A1 | 1/2013 | Burke et al. |
| 2014/0149118 A1 | 5/2014 | Lee et al. |
| 2014/0185815 A1 | 7/2014 | Robleck et al. |
| 2014/0254816 A1 | 9/2014 | Kim et al. |
| 2014/0278372 A1 | 9/2014 | Nakadai |
| 2014/0303969 A1 | 10/2014 | Inose |
| 2014/0334645 A1 | 11/2014 | Yun |
| 2014/0358535 A1 | 12/2014 | Lee |
| 2015/0006176 A1 | 1/2015 | Pogue et al. |
| 2015/0039317 A1 | 2/2015 | Klein |
| 2015/0058018 A1 | 2/2015 | Georges |
| 2015/0111539 A1 | 4/2015 | Shim |
| 2015/0162006 A1 | 6/2015 | Kummer |
| 2015/0296268 A1 | 10/2015 | Lee |
| 2015/0331666 A1 | 11/2015 | Bucsa et al. |
| 2016/0055850 A1 | 2/2016 | Nakadai |
| 2016/0071526 A1 | 3/2016 | Wingate et al. |
| 2016/0077794 A1 | 3/2016 | Kim et al. |
| 2016/0140957 A1 | 5/2016 | Duta |
| 2016/0148615 A1 | 5/2016 | Lee |
| 2016/0156766 A1 | 6/2016 | Nishikawa |
| 2016/0217789 A1 | 7/2016 | Lee |
| 2016/0307570 A1 | 10/2016 | Mizumoto et al. |
| 2017/0032244 A1 | 2/2017 | Kurata |
| 2017/0053648 A1 | 2/2017 | Chi |
| 2017/0053650 A1 | 2/2017 | Ogawa |
| 2017/0069321 A1 | 3/2017 | Toiyama |
| 2017/0076720 A1 | 3/2017 | Gopalan |
| 2017/0076726 A1 | 3/2017 | Bae |
| 2017/0090864 A1 | 3/2017 | Jorgovanovic |
| 2017/0097992 A1 | 4/2017 | Voulin et al. |
| 2017/0103755 A1 | 4/2017 | Jeon |
| 2017/0242651 A1 | 8/2017 | Lang |
| 2017/0242653 A1 | 8/2017 | Lang |
| 2017/0242657 A1 | 8/2017 | Jarvis et al. |
| 2017/0300990 A1 | 10/2017 | Tanaka |
| 2018/0012593 A1 | 1/2018 | Prasad et al. |
| 2018/0033428 A1 | 2/2018 | Kim |
| 2018/0122378 A1 | 5/2018 | Mixter et al. |
| 2018/0165055 A1* | 6/2018 | Yu ..................... H04L 65/60 |
| 2018/0182383 A1 | 6/2018 | Kim |
| 2018/0182397 A1 | 6/2018 | Carbune |
| 2018/0188948 A1 | 7/2018 | Ouyang |
| 2018/0189390 A1 | 7/2018 | Crèmer et al. |
| 2018/0190264 A1 | 7/2018 | Mixter |
| 2018/0211665 A1 | 7/2018 | Park |
| 2018/0211666 A1 | 7/2018 | Kolavennu |
| 2018/0233136 A1 | 8/2018 | Torok et al. |
| 2018/0233137 A1 | 8/2018 | Torok et al. |
| 2018/0233142 A1 | 8/2018 | Koishida |
| 2018/0286394 A1 | 10/2018 | Li |
| 2018/0286414 A1 | 10/2018 | Ravindran |
| 2018/0286433 A1 | 10/2018 | Hicks et al. |
| 2018/0324536 A1 | 11/2018 | Drinkwater |
| 2018/0349093 A1 | 12/2018 | McCarty |
| 2019/0051298 A1 | 2/2019 | Lee |
| 2019/0073999 A1 | 3/2019 | Premont et al. |
| 2019/0074014 A1 | 3/2019 | Wilberding |
| 2019/0081810 A1 | 3/2019 | Jung |
| 2019/0087455 A1 | 3/2019 | He |
| 2019/0096419 A1 | 3/2019 | Giacobello |
| 2019/0115018 A1 | 4/2019 | Zurek et al. |
| 2019/0124388 A1 | 4/2019 | Schwartz |
| 2019/0205467 A1 | 7/2019 | Wold et al. |
| 2019/0206391 A1 | 7/2019 | Busch |
| 2019/0237067 A1 | 8/2019 | Friedman |
| 2019/0244608 A1 | 8/2019 | Choi |
| 2019/0251960 A1 | 8/2019 | Maker et al. |
| 2019/0295542 A1 | 9/2019 | Huang |
| 2019/0319960 A1 | 10/2019 | Shen |
| 2019/0320260 A1 | 10/2019 | Alders et al. |
| 2019/0348044 A1 | 11/2019 | Chun |
| 2019/0355365 A1 | 11/2019 | Kim et al. |
| 2019/0362714 A1 | 11/2019 | Mori |
| 2020/0066271 A1 | 2/2020 | Li et al. |
| 2020/0074909 A1 | 3/2020 | Kim |
| 2020/0074995 A1* | 3/2020 | Rosenberg ....... G10K 11/17837 |
| 2020/0077218 A1 | 3/2020 | Nakadai |
| 2020/0098354 A1 | 3/2020 | Lin |
| 2020/0105245 A1 | 4/2020 | Gupta |
| 2020/0105264 A1 | 4/2020 | Jang |
| 2020/0211539 A1 | 7/2020 | Lee |
| 2020/0211550 A1 | 7/2020 | Pan |
| 2020/0219493 A1 | 7/2020 | Li |
| 2020/0221180 A1 | 7/2020 | Pletsch |
| 2020/0234709 A1 | 7/2020 | Kunitake |
| 2020/0265838 A1 | 8/2020 | Lee |
| 2020/0310751 A1 | 10/2020 | Anand |
| 2020/0357374 A1* | 11/2020 | Verweij ................. H04S 7/304 |
| 2020/0367006 A1* | 11/2020 | Beckhardt ............. H04R 1/26 |
| 2020/0374269 A1* | 11/2020 | Lidman ................ G10L 15/30 |
| 2020/0402490 A1* | 12/2020 | Duthaler ............ G10L 21/0208 |
| 2021/0067867 A1 | 3/2021 | Kagoshima |
| 2021/0349982 A1 | 11/2021 | Frederickson |

FOREIGN PATENT DOCUMENTS

| | | |
|---|---|---|
| CN | 109741755 A | 5/2019 |
| DK | 201770421 A1 | 12/2018 |
| EP | 2306344 A1 | 4/2011 |
| EP | 2939103 A2 | 11/2015 |
| EP | 2965496 A1 | 1/2016 |
| EP | 2965496 B1 | 1/2018 |
| EP | 3306892 A1 | 4/2018 |
| WO | WO2009/001202 A1 | 12/2008 |
| WO | WO2017/197184 A1 | 11/2017 |
| WO | WO2018/211983 A1 | 11/2018 |

(56) References Cited

FOREIGN PATENT DOCUMENTS

| WO | WO2018/236952 A1 | 12/2018 |
|---|---|---|
| WO | WO2019/034083 A1 | 2/2019 |
| WO | WO2019/046173 A1 | 3/2019 |
| WO | WO2019/160787 A1 | 8/2019 |
| WO | WO2019/222996 A1 | 11/2019 |

OTHER PUBLICATIONS

Bromand, Notice of Allowance, U.S. Appl. No. 16/562,318, dated Jun. 29, 2020, 9 pgs.
Bromand, Notice of Allowance, U.S. Appl. No. 16/557,734, dated Apr. 16, 2021, 14 pgs.
Bromand, Office Action, U.S. Appl. No. 16/787,993, dated Jun. 14, 2021, 23 pgs.
Bromand, Notice of Allowance, U.S. Appl. No. 16/787,993, dated Dec. 15, 2021, 9 pgs.
Bromand, Office Action, U.S. Appl. No. 16/788,067, dated Sep. 14, 2021, 21 pgs.
Bromand, Notice of Allowance, U.S. Appl. No. 16/788,067, dated Jan. 7, 2022, 10 pgs.
Bromand, Office Action, U.S. Appl. No. 17/033,326, dated Dec. 24, 2021, 10 pgs.
Bromand, Final Office Action, U.S. Appl. No. 17/033,326, dated Mar. 28, 2022, 11 pgs.
E&T Engineering and Technology, "Amazon proposes bundling multiple virtual assistants in a single device," Sep. 25, 2019, downloaded from https://eandt.theiet.org/content/articles/2019/amazon-proposes-bundling-multiple-virtual-assistnts-in-a-single-device/, 4 pgs.
Heo et al., "Cover Song Identification with Metric Learning Using Distance as a Feature," 18th International Society for Music Information Retrieval Conference, Suzhou, China, 2017, 7 pgs.
Ragno R, et al., "Inferring similarity between music objects with application to playlist generation," Multimedia Information Retrieval, ACM, 2 Penn Plaza, Suite 701, New York, NY 10121-0701 USA, Nov. 10, 2005, pp. 73-80, XP058245557.
Sarfati, Office Action, U.S. Appl. No. 16/797,415, dated May 27, 2022, 22 pgs.
Saruwatari, "Blind Source Separation Combining Independent Component analysis and Beamforming," EURASIP Journal on Applied Signal Processing 2003:11, 1135-1146, © 2003 Hindawi Publishing Corporation, 12 pgs.
Singh A. et al., "A loss function for classification based on a robust similarity metric," Neural Networks (IJCNN), The 2010 International Joint Conference on, IEEE, Piscataway, NJ, USA, Jul. 18, 2010, pp. 1-6, XP031771454, ISBN: 978-1-4244-6916-1.
Spotify AB, Communication Pursuant to Article 94(3), EP19163047.4, dated Feb. 28, 2022, 9 pgs.
Spotify AB, Communication Pursuant to Article 94(3), EP20170208.1, dated Feb. 11, 2022, 5 pgs.
Spotify AB, Extended European Search Report, EP20170208,1, dated Oct. 9, 2020, 6 pgs.
Spotify AB, Extended European Search Report, EP20178734.8, dated Nov. 26, 2020, 10 pgs.
Spotify AB, Summons to attend oral proceedings pursuant to Rule 115(1) EPC, EP20178734.8, dated Oct. 5, 2022, 11 pgs.
Spotify AB, Extended European Search Report, EP20179016.9, dated Aug. 14, 2020, 7 pgs.
Spotify AB, Summons to Attend Oral Proceedings Pursuant to rule 115(1), EP20179016.9, dated May 31, 2022, 9 pgs.
Spotify AB, Extended European Search Report, EP20217407.4, dated Jun. 17, 2021, 9 pgs.
Bromand, Office Action, U.S. Appl. No. 17/033,326, dated Aug. 18, 2022, 11 pgs.

* cited by examiner

SYSTEMS AND METHODS FOR GENERATING A CLEANED VERSION OF AMBIENT SOUND

RELATED APPLICATIONS

This application is a continuation of U.S. application Ser. No. 16/557,734, filed Aug. 30, 2019, which is hereby incorporated by reference in its entirety.

TECHNICAL FIELD

The disclosed embodiments relate generally to media playback, and, in particular, to cancelling audio corresponding to media that is played back at another device.

BACKGROUND

Access to electronic media, such as music and video content, has expanded dramatically over time. As a departure from physical media, media content providers stream media to electronic devices across wireless networks, improving the convenience with which users can digest and experience such content.

Further, media content providers connect with devices that are enabled to receive voice commands as a means of controlling media playback. The audio feedback from a first playback device created by playing the media content can make it more challenging for a second device to accurately identify and interpret voice commands when the devices are located near each other.

SUMMARY

There is a need for systems and methods of generating a cleaned version of ambient sound such that voice commands and wakewords can be identified at a first device, even while media content is played back at another device that is located close to the first device. The media content that is played back at the other device creates ambient sound that is picked up by the first device. The first device generates a cleaned version of the ambient sound so that the cleaned version can be analyzed and voice commands received by the first device can be detected and identified.

In accordance with some embodiments, a method is performed at a first electronic device. The first electronic device has one or more processors and memory storing instructions for execution by the one or more processors. The method includes, while a media content item is emitted by a second electronic device that is remote from the first electronic device, receiving data that includes: timing information, offset information that indicates a difference between an initial position of the media content item and a current playback position of the media content item, and an audio stream that corresponds to the media content item. The method also includes detecting ambient sound that includes sound corresponding to the media content item emitted by the second electronic device and generating a cleaned version of the ambient sound, including: using the timing information and the offset information to align the audio stream with the ambient sound. The method further includes performing a subtraction operation to substantially subtract the audio stream from the ambient sound.

In some embodiments, the timing information includes a clock signal. In some embodiments, the timing information includes an indication of latency between the second electronic device and the first electronic device. In some embodiments, the offset information includes an indication of a time duration between the initial position of the media content item and the current playback position of the media content item. In some embodiments, the offset information includes an indication of a data amount that corresponds to the difference between the initial position of the media content item and the current playback position of the media content item. In some embodiments, the timing information is received from the second electronic device. In some embodiments, the timing information is received from a first server. In some embodiments, the offset information is received from the second electronic device. In some embodiments, the offset information is received from a first server. In some embodiments, the audio stream has a lower data rate than the media content item stream that is provided to the second electronic device. In some embodiments, the audio stream is received from the second electronic device. In some embodiments, the audio stream is received from a first server. In some embodiments, the audio stream is received from a second server distinct from a first server. In some embodiments, the timing information is embedded in the audio stream. In some embodiments, the method includes analyzing the cleaned version of the ambient sound to determine whether a command is present in them ambient sound. In some embodiments, the first electronic device is not playing the media content item. In some embodiments, the first electronic device is playing the media content item.

In accordance with some embodiments, a first electronic device (e.g., a server system, a client device, etc.) includes one or more processors and memory storing one or more programs configured to be executed by the one or more processors. The one or more programs include instructions for, while a media content item is emitted by a second electronic device that is remote from the first electronic device, receiving data that includes: timing information, offset information that indicates a difference between an initial position of the media content item and a current playback position of the media content item, and an audio stream that corresponds to the media content item. The one or more programs also include instructions for detecting ambient sound that includes sound corresponding to the media content item emitted by the second electronic device and generating a cleaned version of the ambient sound, including using the timing information and the offset information to align the audio stream with the ambient sound and performing a subtraction operation to substantially subtract the audio stream from the ambient sound.

In accordance with some embodiments, a computer-readable storage medium has stored therein instructions that, when executed by an electronic device, cause the first electronic device to, while a media content item is emitted by a second electronic device that is remote from the first electronic device, receive data that includes: timing information, offset information that indicates a difference between an initial position of the media content item and a current playback position of the media content item, and an audio stream that corresponds to the media content item. The instructions further cause the first electronic device to detect ambient sound that includes sound corresponding to the media content item emitted by the second electronic device and generate a cleaned version of the ambient sound, including using the timing information and the offset information to align the audio stream with the ambient sound and performing a subtraction operation to substantially subtract the audio stream from the ambient sound.

Thus, systems are provided with improved methods for providing information associated with media content items based on a proxy media content item.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
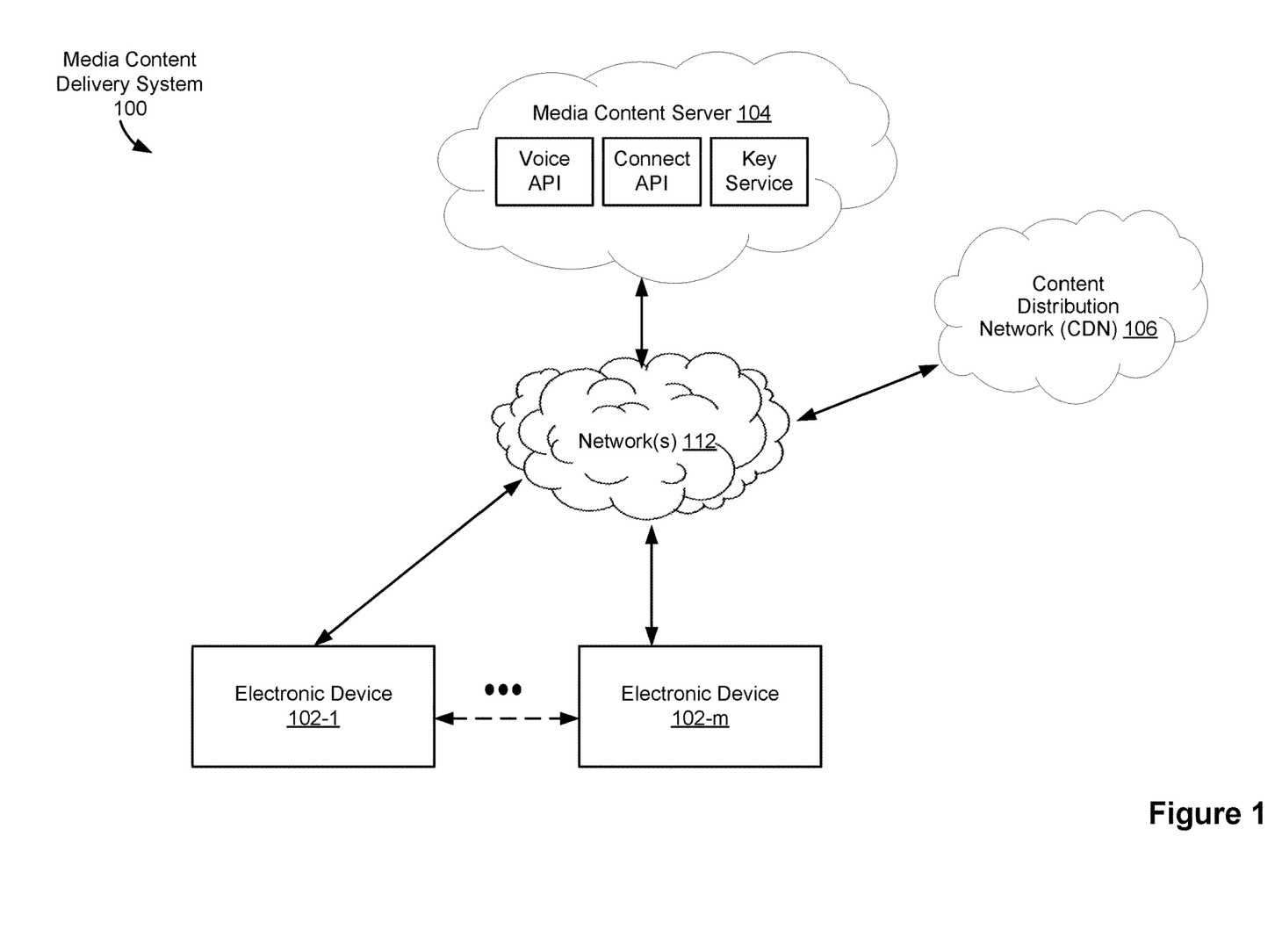
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API (e.g., voice recognition module 316, FIG. 3), a connect API, and/or key service (e.g., key database 336, FIG. 3). In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
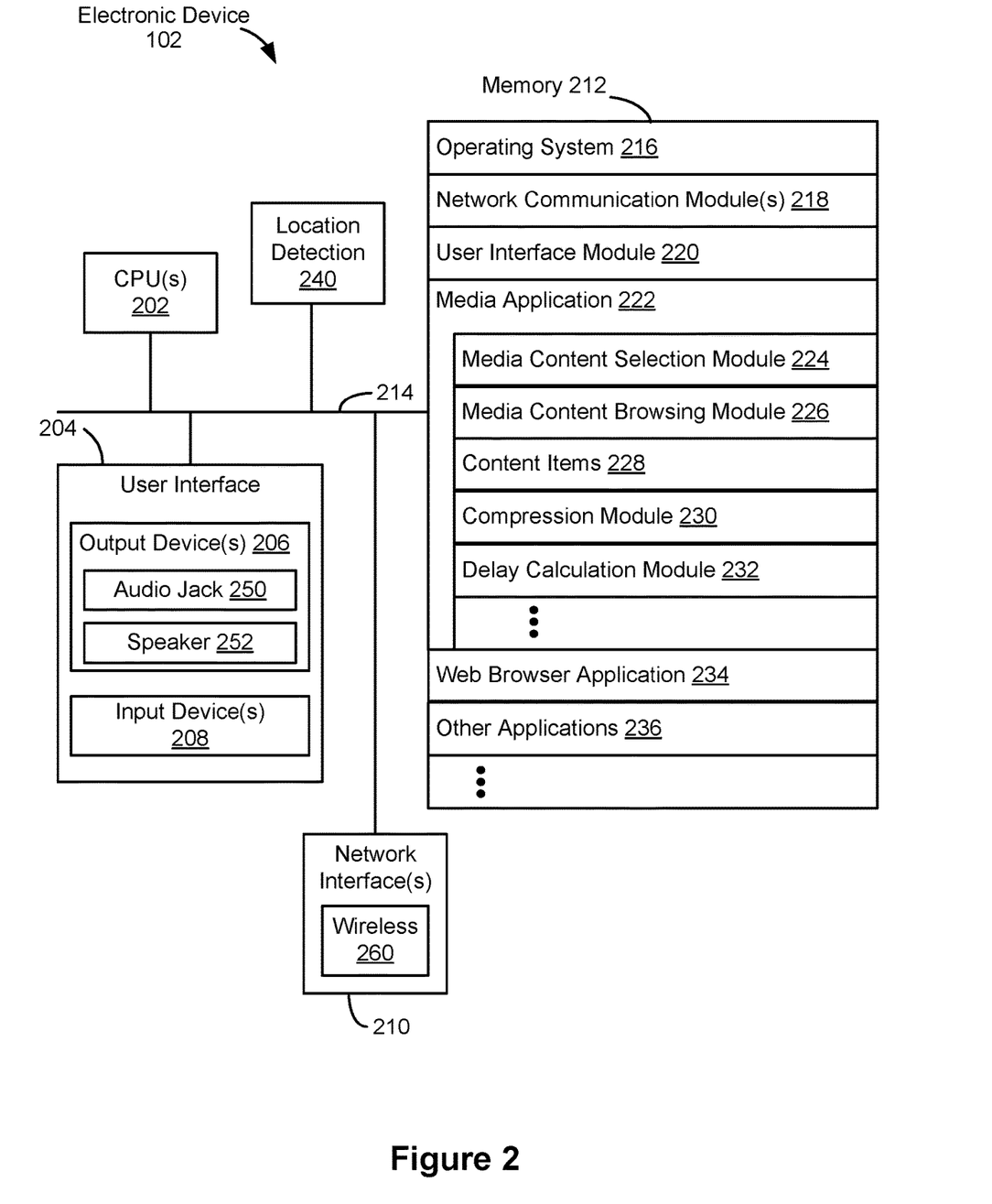
FIG. 2 is a block diagram illustrating a client device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems 108, and/or or other wireless (e.g., Bluetooth-compatible) devices (e.g., for streaming audio data to the media presentations system 108 of an automobile). Furthermore, in some embodiments, the wireless interface 260 (or a different communications interface of the one or more network interfaces 210) enables data communications with other WLAN-compatible devices (e.g., a media presentations system 108) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the client device 102 to other computing devices (e.g., media presentation system(s) 108, media content server 104, and/or other client devices) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
    - a media content selection module 224 for selecting one or more media content items and/or sending, to the media content server, an indication of the selected media content item(s);
    - a media content browsing module 226 for providing controls and/or user interfaces enabling a user to navigate, select for playback, and otherwise control or interact with media content, whether the media content is stored or played locally or remotely;
    - a content items module 228 for processing uploaded media items and storing media items for playback and/or for forwarding to the media content server;
    - compression module 230 for compressing and/or decompressing media content; and
    - delay calculation module 232 for sending, receiving and/or tracking a delay (e.g., latency) between electronic device 102 and other electronic device(s), and/or for receiving and tracking timing information (e.g., from media content server 104).
- a web browser application 234 (e.g., Internet Explorer or Edge by Microsoft, Firefox by Mozilla, Safari by Apple, or Chrome by Google) for accessing, viewing, and interacting with web sites; and
- other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
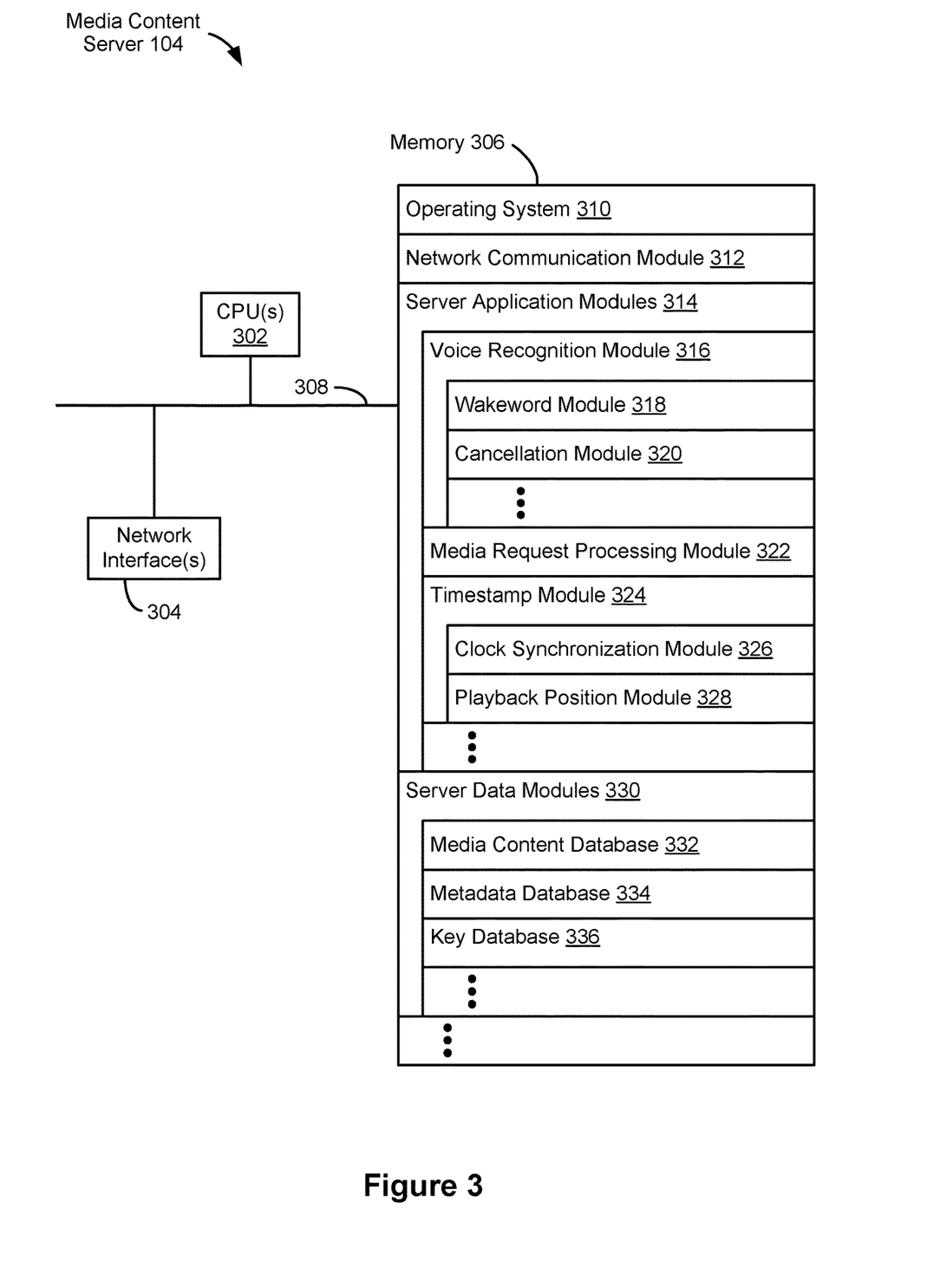
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:

a voice recognition module 316 for identifying and/or interpreting one or more voice commands received at an electronic device, the voice recognition module 316 including, but not limited to, one or more of:
- a wakeword module 318 for determining whether a wakeword has been received at the electronic device, the wakeword used to identify a voice command that follows the wakeword (e.g., after the wakeword is received, the electronic device records additional voice commands); and
- a cancellation module 320 for performing a subtraction of audio to reduce and/or eliminate ambient noise to generate a clean version of a voice command received at the electronic device; and a media request processing module 322 for processing requests for media content and facilitating access to requested media items by client devices (e.g., the client device 102) including, optionally, streaming media content to such devices and/or to one or more media presentation system(s) 108;

a timestamp module 324 for providing indications of timing (e.g., of current time and/or timing related to playback of a media content item), including, but not limited to, one or more of:
- a clock synchronization module 326 for generating and/or sending, to an electronic device, a clock synchronization signal or other timing information; and
- a playback position module 328 for processing (e.g., identifying and/or providing to the electronic device) timing information related to playback of a media content item;

one or more server data module(s) 330 for handling the storage of and/or access to media items and/or metadata relating to the media items; in some embodiments, the one or more server data module(s) 330 include:
- a media content database 332 for storing media items;
- a metadata database 334 for storing metadata relating to the media items; and
- a key database 336 for storing keys related to account information for user media accounts, such as user profiles, credentials (e.g., user identifiers, passwords, email addresses, etc.), and/or identifiers of any linked accounts.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4:
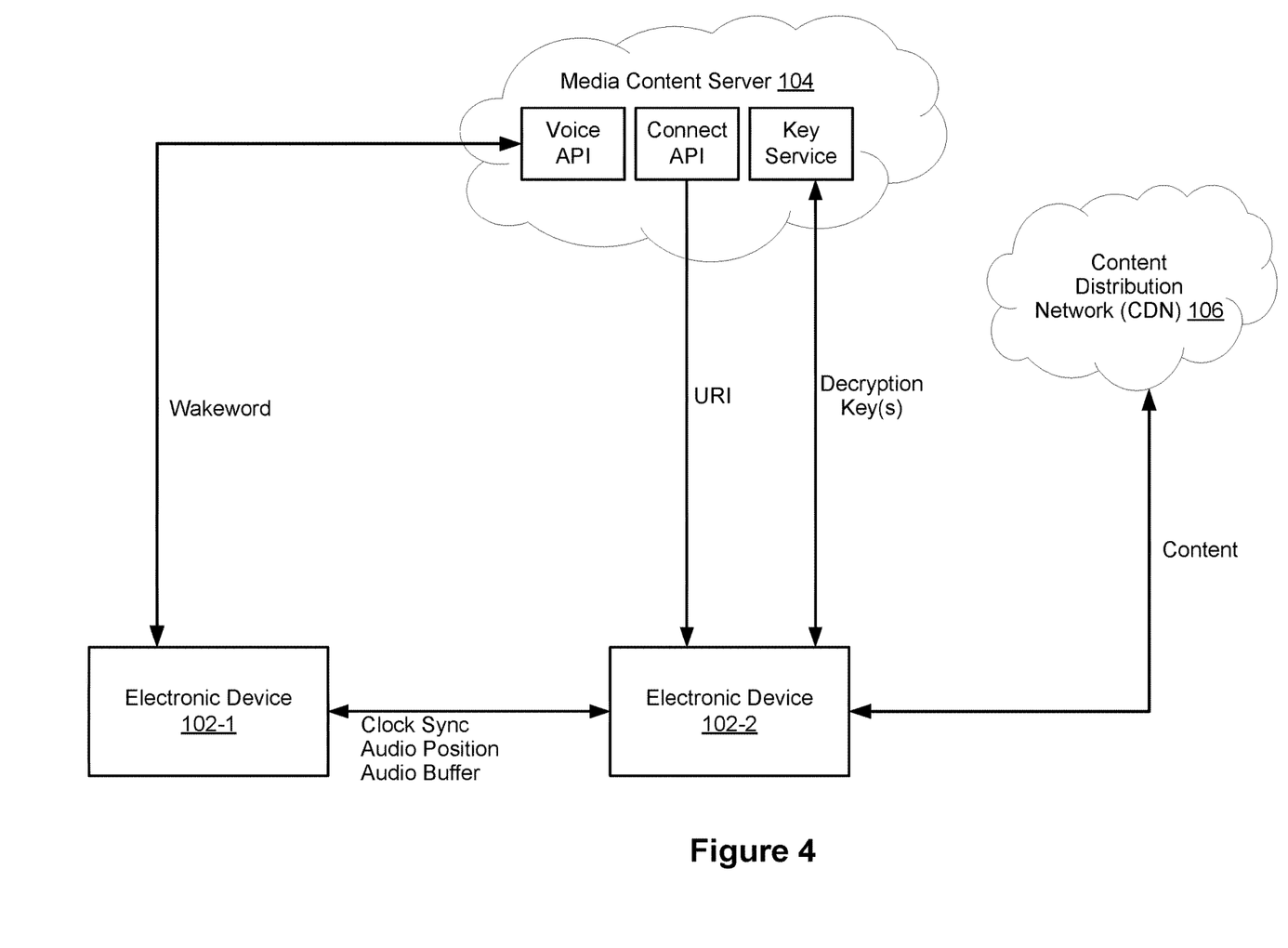
FIG. 4 is a block diagram illustrating a first system architecture for generating a cleaned version of ambient sound, in accordance with some embodiments.

FIG. 4 is a block diagram illustrating a first system architecture for generating a cleaned version of ambient sound, in accordance with some embodiments. In some embodiments, electronic device 102-2 communicates (e.g., over network(s) 112) with media content server 104, including a "Connect API" (e.g., Network Communication Module 312) and "Key Service" (e.g., Key Database 336). In some embodiments, media content server 104, using the Connect API, sends a URI to electronic device 102-2 to establish a connection between media content server 104 and electronic device 102-2. In some embodiments, electronic device 102-2 sends, to media content server 104, a request for one or more decryption key(s). In some embodiments, media content server 104 sends one or more decryption keys (from Key Service) to electronic device 102-2 to establish a secure communications channel between the media content server and the electronic device. In some embodiments, media content server 104 uses decryption keys to verify a user account associated with electronic device 102-2 (e.g., to authorize and/or provide access to media content received from CDN 106).

In some embodiments, electronic device 102-2 sends (via network(s) 112), to media content server 104 and/or CDN 106, a request for media content. In some embodiments, media content server 104 and/or CDN 106 determines whether electronic device 102-2 is authorized to access the media content. For example, electronic device 102-2 is authorized to access the media content after connecting (e.g., exchanging decryption keys) with media content server 104.

In response to receiving the request for media content and determining that the electronic device 102-2 is authorized, CDN 106 sends media content to the electronic device 102-2 for playback. In some embodiments, media content server 104 sends and instruction to CDN 106 to send the media content to electronic device 102-2.

In some embodiments, electronic device 102-2 is communicatively coupled (e.g., using network communication module(s) 218, FIG. 2) with electronic device 102-1. In some embodiments, electronic device 102-1 is a speaker (e.g., or other mobile device) that includes a microphone.

In some embodiments, electronic device 102-1 and electronic device 102-2 perform a handshake to establish a communications channel between the electronic devices. For example, electronic device 102-1 and electronic device 102-2 exchange clock synchronization information (e.g., to match timing between the electronic devices), audio position information (e.g., representing a current playback position of a media content item), and/or audio buffer information (e.g., storing media content as blocks and/or chunks). In some embodiments, the audio position information comprises a current playback time (in ms) measured from a beginning of the media content item that is presented at electronic device 102-2. For example, the audio position information represents how much time has passed since the start of presentation of the media content item. In some embodiments, the audio position information comprises a byte offset. For example, when a same version of media content is sent to both electronic devices, a byte offset representing a change in a size of data of the media content. In some embodiments, the byte offset is measured from a beginning (e.g., a full size) of the media content item. In some embodiments, the audio buffer represents the media content item that is playing at electronic device 102-2 (e.g., the media content item stored as chunks of data). In some embodiments, the audio buffer is encrypted (e.g., or decrypted). When the electronic device 102-1 receives the audio buffer, the electronic device 102-1 decrypts (if needed) the audio buffer and streams the audio buffer to a digital signal processor (e.g., CPU) of the electronic device 102-1, and the electronic device 102-1 applies acoustic echo cancellation (AEC).

In some embodiments, electronic device 102-1 calculates a delay (e.g., using delay calculation module 232) of the communications channel over which electronic device 102-1 and electronic device 102-2 communicate. For example, the electronic device 102-1 uses the clock synchronization information received from the electronic device 102-2 to calculate the delay. In some embodiments, the handshake between the electronic devices is used to calculate the delay. In some embodiments, the delay calculation is performed periodically (e.g., to refresh and/or adapt a time delay over time). For example, the delay calculation is performed every 64 ms. In some embodiments, the delay calculation is performed at fixed intervals. In some embodiments, the delay calculation is performed at a rate that varies with time. For example, a higher frequency of sampling is performed after the initial handshake, and the frequency of the sampling decreases over time. For example, after the initial handshake, the delay calculation is performed more often (e.g., every 10 ms) and over time, the delay calculation is performed less often (e.g., 2 minutes after the handshake is performed, the delay calculation is performed every 30 ms). In some embodiments, the delay calculation is performed as often as needed (e.g., based on the network connection) to maintain synchronization between the electronic devices.

In some embodiments, electronic device 102-2 presents (e.g., plays) media content received from CDN 106. In some embodiments, electronic device 102-1 receives (e.g., from electronic device 102-2) an audio position (e.g., timing information) of the media content that is presented at electronic device 102-2, but electronic device 102-1 does not present (e.g., playback) the media content. For example, electronic device 102-1 is aware of the media content that is playing at electronic 102-2 such that electronic device 102-1 performs audio cancellation (e.g., subtraction) of the audio from electronic device 102-2 and is better able to detect voice commands received at the electronic device 102-1.

In some embodiments, electronic device 102-1 also plays the media content that is presented at electronic device 102-2 and synchronizes playback with electronic device 102-2 (e.g., such that both electronic devices 102-1 and 102-2 present the media content simultaneously).

In some embodiments, electronic device 102-2 compresses (e.g., using compression module 230) the media content received from CDN 106 and sends the compressed version of the media content to electronic device 102-1. For example, when electronic device 102-1 is not playing back the media content, the bandwidth required to send the electronic device 102-1 audio information related to the media content item is reduced by sending a compressed version of the audio item. In some embodiments, the compressed version of the media content item comprises a lower bitrate than the uncompressed version of the media content item. In some embodiments, the electronic device 102-2 forwards the media content item (e.g., without performing compression) to electronic device 102-1.

In some embodiments, electronic device 102-1 is enabled to receive (e.g., via a microphone of electronic device 102-1) voice commands. In some embodiments, electronic device 102-1 is enabled to record voice commands in response to detecting a wakeword. In some embodiments, the wakeword comprises a predefined command that signals to the electronic device 102-1 to record audio that is received after detection of the predefined command. For example, the electronic device 102-1 detects (e.g., receives) the wakeword, "Hey, Spotify," and, in response to detecting the wakeword, the electronic device 102-1 records the audio that is received after detection of "Hey, Spotify," such as a voice command (e.g., "Play song X in the kitchen").

In some embodiments, electronic device 102-1 is communicatively coupled to media content server 104 (e.g., a voice API of media content server 104 that corresponds to voice recognition module 316, FIG. 3). In some embodiments, electronic device 102-1 processes the wakeword and/or the voice command and sends, to the media content server, the processed wakeword and/or voice command. In some embodiments, the electronic device 102-1 records the wakeword and/or the audio corresponding to a voice command and forwards the recorded audio to the voice API of media content server 104.

In response to receiving the recorded audio, the voice API of media content server (e.g., voice recognition module 316) parses (e.g., processes) the recorded audio to determine whether a voice command was received. If the media content server determines that a voice command was received at the electronic device 102-1, the media content server (e.g., using media request processing module 322) identifies a media request corresponding to the voice command and sends an instruction to complete the media request. In some embodiments, the media content server sends the instruction to electronic device 102-1 for execution. In some embodiments, the media content server sends the instruction to electronic device 102-2. In some embodiments, the media content server sends the instruction to CDN 106. The media content server sends the instruction to different electronic devices depending on the command. For example, if the command is to "play song X on electronic device 102-2," then the media content server sends the instruction to electronic device 102-2. In some embodiments, the media content server sends the instruction to electronic device 102-1, and the electronic device 102-1 forwards the command to electronic device 102-2. In some embodiments, the media content server 104 sends the command to a plurality of electronic devices and/or CDN 106.

Figure 5:
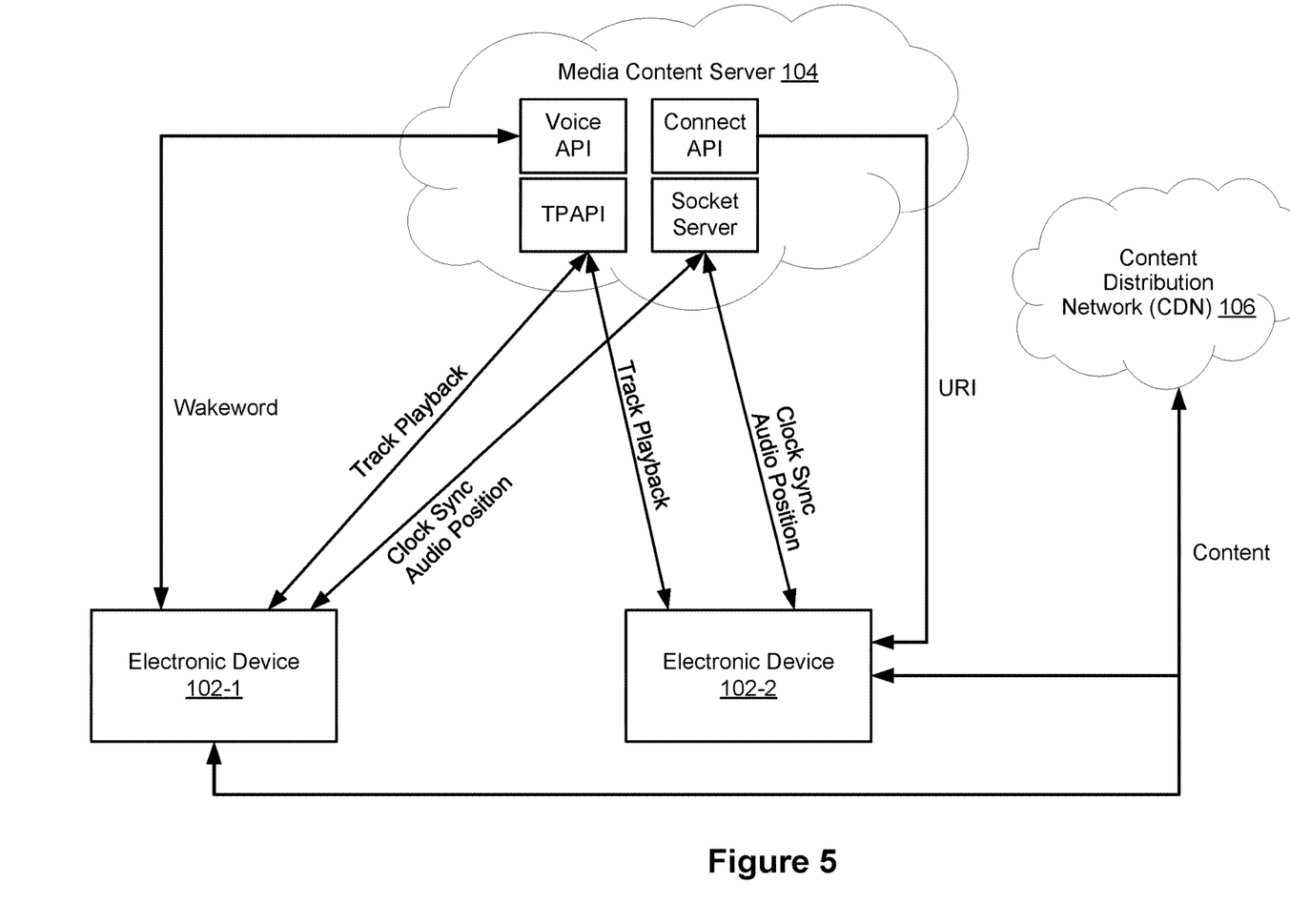
FIG. 5 is a block diagram illustrating a second system architecture for generating a cleaned version of ambient sound, in accordance with some embodiments.

FIG. 5 is a block diagram illustrating a second system architecture for generating a cleaned version of ambient sound, in accordance with some embodiments. In this architecture, CDN 106 sends content to electronic device 102-1 and to electronic device 102-2. As illustrated, electronic devices 102-1 and 102-2 communicate timing information and audio position information through media content server 104.

As described with reference to FIG. 4, in some embodiments, electronic device 102-2 communicates (e.g., over network(s) 112) with media content server 104, including a "Connect API" (e.g., Network Communication Module 312) and "Key Service" (e.g., Key Database 336). In some embodiments, media content server 104, using the Connect API, sends a URI to electronic device 102-2 to establish a connection between media content server 104 and electronic device 102-2. In some embodiments, electronic device 102-2 sends, to media content server 104, a request for one or more decryption key(s). In some embodiments, media content server 104 sends one or more decryption keys (from Key Service) to electronic device 102-2 to establish a secure communications channel between the media content server and the electronic device. In some embodiments, media content server 104 uses decryption keys to verify a user account associated with electronic device 102-2 (e.g., to authorize and/or provide access to media content received from CDN 106).

In some embodiments, electronic device 102-1 is communicatively coupled to media content server 104 (e.g., a voice API of media content server 104 that corresponds to voice recognition module 316, FIG. 3). In some embodiments, electronic device 102-1 processes the wakeword and/or the voice command and sends, to the media content server, the processed wakeword and/or voice command. In some embodiments, the electronic device 102-1 records the wakeword and/or the audio corresponding to a voice command and forwards the recorded audio to the voice API of media content server 104.

Figure 6A:
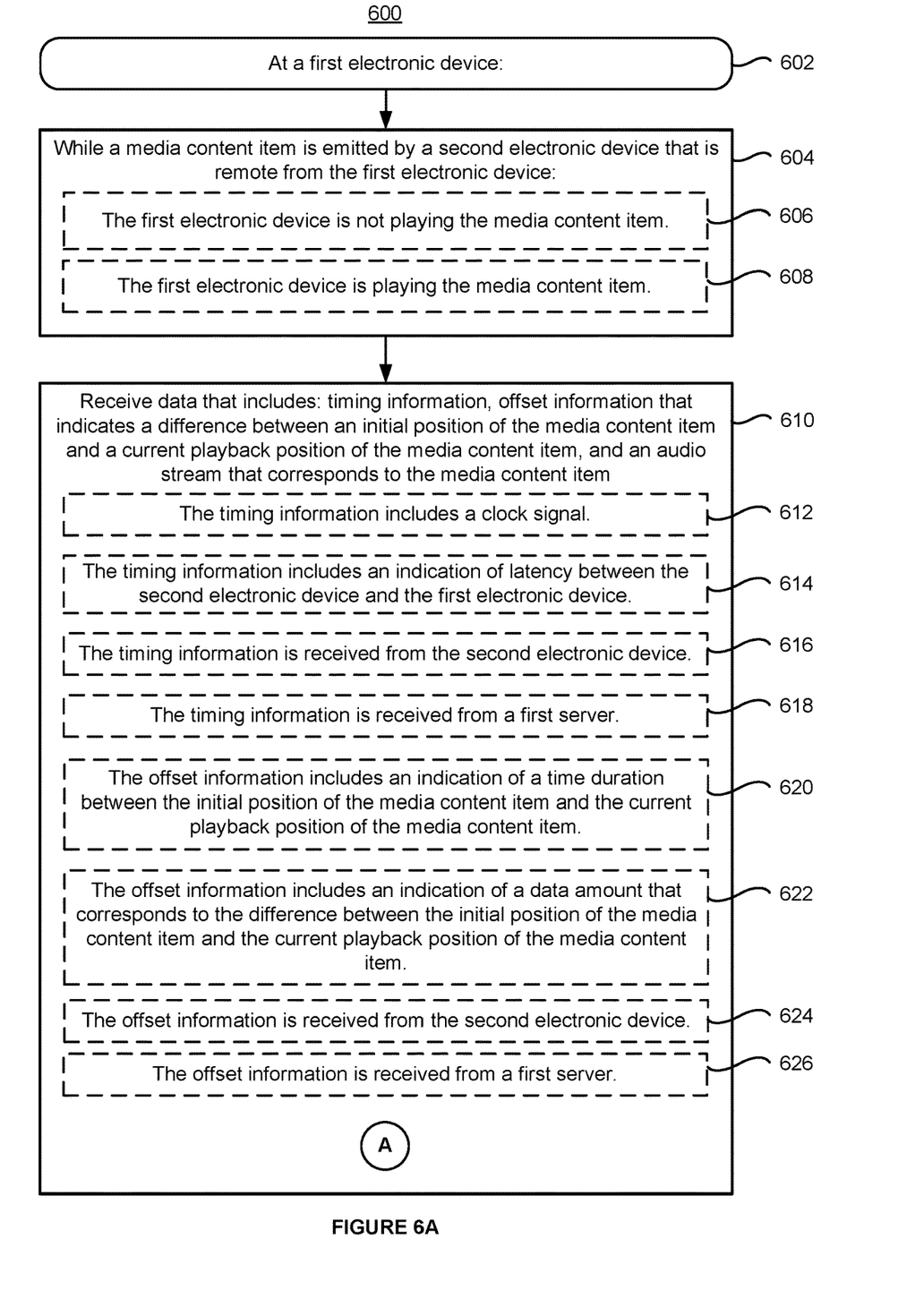
FIGS. 6A-6B are flow diagrams illustrating a method of generating a cleaned version of ambient sound, in accordance with some embodiments.
Figure 6B:
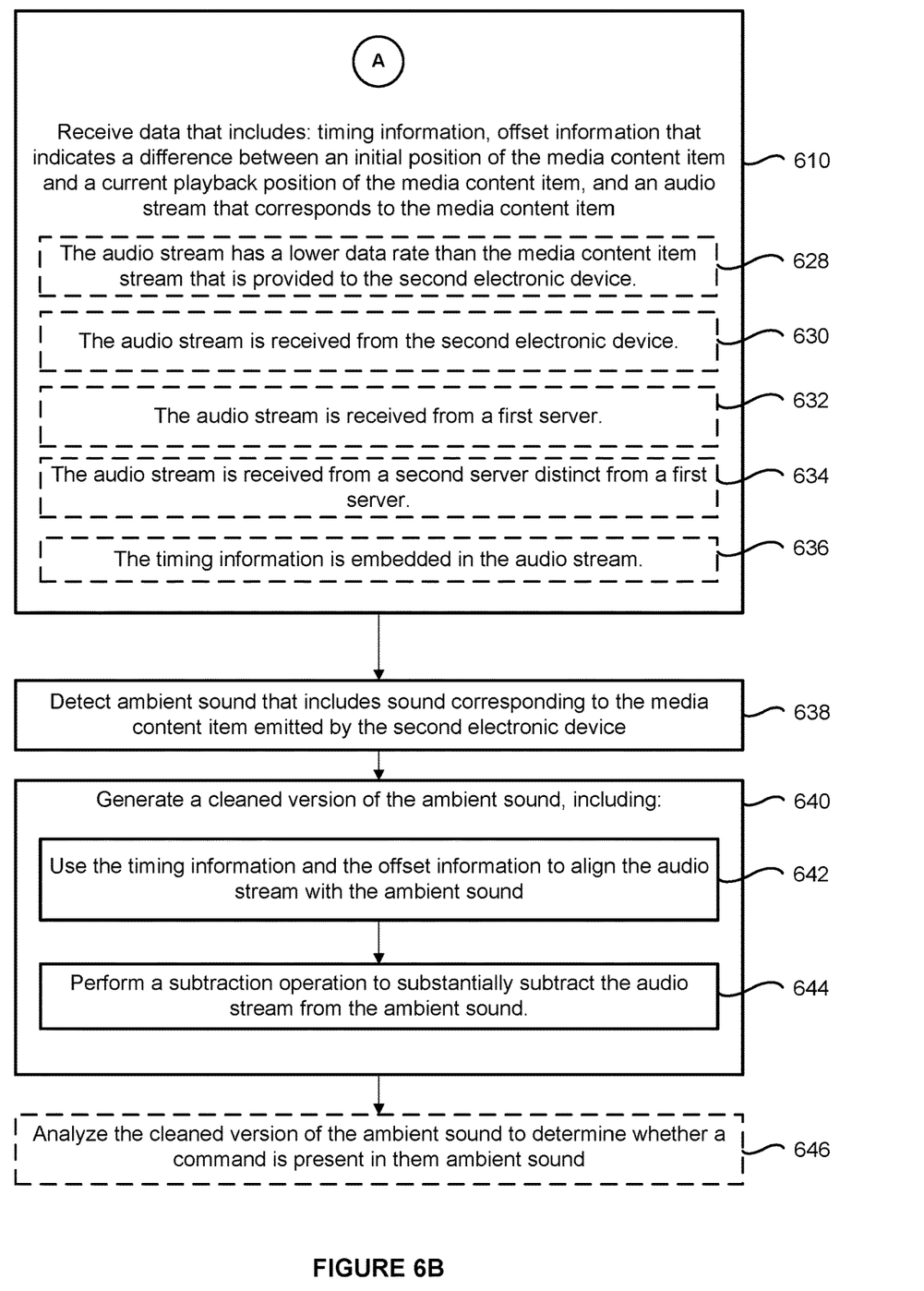

FIGS. 6A-6B are flow diagrams illustrating a method 600 for generating a cleaned version of ambient sound, in accordance with some embodiments. Method 600 may be performed (602) at a first electronic device (e.g., electronic device 102-1), the electronic device having one or more processors and memory storing instructions for execution by the one or more processors. In some embodiments, the method 600 is performed by executing instructions stored in the memory (e.g., memory 212, FIG. 2) of the electronic device. In some embodiments, the method 600 is performed by a combination of the server system (e.g., including media content server 104 and CDN 106) and an electronic device (e.g., a client device). In some embodiments, the server system provides tracks (e.g., media items) for playback to the electronic device(s) 102 of the media content delivery system 100.

Referring now to FIG. 6A, in performing the method 600, while a media content item is emitted by a second electronic device (e.g., electronic device 102-2) that is remote from the first electronic device (e.g., electronic device 102-1) (604), the electronic device receives (610) data that includes timing information, offset information that indicates a difference between an initial position of the media content item and a current playback position of the media content item, and an audio stream that corresponds to the media content item. For example, the second electronic device (e.g., electronic device 102-2) is playing the media content item. In some embodiments, the second electronic device 102-2 (e.g., active device) includes a speaker and the first electronic device 102-1 (e.g., master device) includes a microphone.

In some embodiments, the first electronic device is not playing (606) the media content item. For example, in some embodiments, as described with reference to FIGS. 4 and 5, a first electronic device (e.g., electronic device 102-1) is not playing the media content item. For example, the second electronic device (e.g., electronic device 102-2) emits the media content item but the first electronic device does not emit the media content item.

In some embodiments, the first electronic device is playing (608) the media content item. For example, first electronic device 102-1 plays the media content item while electronic device 102-2 also plays the media content item. In some embodiments, there is a latency (e.g., offset) between the first and second electronic devices. In some embodiments, the first electronic device performs a local cancellation (e.g., at the first electronic device 102-1) to remove the locally played media content item from the cleaned version of the ambient sound. For example, electronic device 102-1 performs cancellation to avoid (e.g., remove) feedback from the media content item emitted by the second electronic device 102-2.

In some embodiments, the timing information includes (612) a clock signal. For example, in some embodiments, the clock signal is received from an NTP server. In some embodiments, the timing information is sent, from the NTP server, to the first electronic device and the second electronic device (e.g., as illustrated in FIG. 5).

In some embodiments, the timing information includes (614) an indication of latency between the second electronic device and the first electronic device. For example, the indication of latency includes a round trip time between the second electronic device (e.g., electronic device 102-2) and the first electronic device (e.g., electronic device 102-1). For example, the timing information is established during a handshaking process between the first electronic device and the second electronic device. In some embodiments, the handshaking process is, performed initially, periodically, and/or in response to a request (from either of the electronic devices 102 and/or media content server 104).

In some embodiments, the timing information is received (616) from the second electronic device (e.g., electronic device 102-2). For example, during the handshaking process between the first electronic device and the second electronic device, the second electronic device sends, to the first electronic device, the timing information (e.g., as illustrated in FIG. 4).

In some embodiments, the timing information is received (618) from a first server. (e.g. an NTP server of the Spotify cloud) For example, the clock synchronization signal is received from the NTP server (e.g., as illustrated in FIG. 5).

In some embodiments, the offset information includes (620) an indication of a time duration between the initial position of the media content item and the current playback position of the media content item.

In some embodiments, the offset information includes (622) an indication of a data amount that corresponds to the difference between the initial position of the media content item and the current playback position of the media content item. (e.g., byte offset)

In some embodiments, the offset information is received (624) from the second electronic device. In some embodiments, the offset information and the timing information are received from the second electronic device. For example, as illustrated in FIG. 4, the offset information (e.g., audio position) and timing information (e.g., clock synchronization) are sent from the second electronic device 102-2 to the first electronic device 102-1.

In some embodiments, the offset information is received (626) from a first server. For example, the timing information and the offset information are received from the first server. For example, as illustrated in FIG. 5, the timing information (e.g., clock synchronization) and offset information (e.g., audio position) are received, by the first electronic device 102-1 and the second electronic device 102-2, from media content server 104.

In some embodiments, the audio stream has (628) a lower data rate than the media content item stream that is provided (e.g., by the first server or the second server) to the second electronic device. For example, the media content (e.g., audio buffer) received by the first electronic device 102-1 is a compressed version (e.g., a lower bit rate version) of the media content received by the second electronic device 102-2 from CDN 106. For example, as described with reference to FIG. 4, electronic device 102-2 compresses the media content received from CDN 106 and sends, to electronic device 102-1, the compressed version of the media content (e.g., in an audio buffer).

In some embodiments, the audio stream is received (630) from the second electronic device (as shown in FIG. 4).

In some embodiments, the audio stream is received (632) from a first server. For example, in some embodiments, the audio stream is received from media content server 104. In some embodiments, the first server (e.g., media content server 104) includes CDN 106 and the audio stream is received from the media content server 104.

In some embodiments, the audio stream is received (634) from a second server distinct from a first server. For example, as shown in FIG. 5, the audio stream (e.g., content) is received by the electronic devices 102 from CDN 106. In some embodiments, CDN 106 is distinct from the first server (e.g., media content server 104).

In some embodiments, the timing information is embedded (636) in the audio stream. For example, timing and/or offset indication is encoded as a watermark that is superimposed over the audio stream such that it is acoustically masked by the audio stream.

The first electronic device detects (638) ambient sound that includes sound corresponding to the media content item emitted by the second electronic device.

The first electronic device generates (640) a cleaned version of the ambient sound, including: using the timing information and the offset information to align (642) the audio stream with the ambient sound and performing (644) a subtraction operation to substantially subtract the audio stream from the ambient sound. In some embodiments, the first electronic device uses acoustic echo cancellation to generate the cleaned version of the ambient sound.

In some embodiments, the electronic device analyzes (646) the cleaned version of the ambient sound to determine whether a command is present in them ambient sound. Fr example, electronic device 102-1, after generating the cleaned version of the ambient sound, analyzes the cleaned version of the ambient sound to detect a voice command, such as a wakeword.

In some embodiments, the electronic device sends, to a first server (e.g., media content server 104) an indication that the command is present in the ambient sound. For example, the electronic device 102-1 forwards the cleaned version of the ambient sound to media content server 104 (e.g., voice API). Media content server 104 is enabled to parse the cleaned version of the ambient sound, identify the command, and cause one or more electronic devices to execute the identified command.

Although FIGS. 6A-6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method performed by a first electronic device associated with a media-providing service, the method comprising:
   while a media content item provided by the media-providing service is emitted by a second electronic device that is remote from the first electronic device:
      receiving, from the media-providing service, data that includes an audio stream that corresponds to the media content item;
      detecting ambient sound that includes sound corresponding to the media content item emitted by the second electronic device; and
      generating a cleaned version of the ambient sound, including:
         using the data received from the media-providing service to align the audio stream with the ambient sound; and
         performing a subtraction operation to subtract the audio stream from the ambient sound; and
      detecting a voice command in the cleaned version of the ambient sound.

2. The method of claim 1, wherein the data received from the media-providing service further includes timing information and offset information that indicates a difference between an initial position of the media content item and a current playback position of the media content item.

3. The method of claim 2, wherein the timing information includes a clock signal.

4. The method of claim 2, wherein the timing information includes an indication of latency between the second electronic device and the first electronic device.

5. The method of claim 2, wherein the offset information includes an indication of a time duration between the initial position of the media content item and the current playback position of the media content item.

6. The method of claim 2, wherein the offset information includes an indication of a data amount that corresponds to the difference between the initial position of the media content item and the current playback position of the media content item.

7. The method of claim 1, wherein at least a portion of the data received from the media-providing service is received from the second electronic device.

8. The method of claim 1, wherein at least a portion of the data received from the media-providing service is received from a first server associated with the media-providing service.

9. The method of claim 1, wherein the audio stream has a lower data rate than the media content item that is streamed to the second electronic device.

10. The method of claim 2, wherein the timing information is embedded in the audio stream.

11. The method of claim 1, wherein the first electronic device is not playing the media content item.

12. The method of claim 1, wherein the first electronic device is playing the media content item.

13. A first electronic device associated with a media-providing service, comprising:
one or more processors; and
memory storing instructions for execution by the one or more processors, the instructions including instructions for:
while a media content item provided by the media-providing service is emitted by a second electronic device that is remote from the first electronic device:
receiving, from the media-providing service, data that includes an audio stream that corresponds to the media content item;
detecting ambient sound that includes sound corresponding to the media content item emitted by the second electronic device; and
generating a cleaned version of the ambient sound, including:
using the data received from the media-providing service to align the audio stream with the ambient sound; and
performing a subtraction operation to subtract the audio stream from the ambient sound; and
detecting a voice command in the cleaned version of the ambient sound.

14. The first electronic device of claim 13, wherein the data received from the media-providing service further includes timing information and offset information that indicates a difference between an initial position of the media content item and a current playback position of the media content item.

15. The first electronic device of claim 14, wherein the timing information includes a clock signal.

16. The first electronic device of claim 14, wherein the timing information includes an indication of latency between the second electronic device and the first electronic device.

17. The first electronic device of claim 14, wherein the offset information includes an indication of a time duration between the initial position of the media content item and the current playback position of the media content item.

18. The first electronic device of claim 14, wherein the offset information includes an indication of a data amount that corresponds to the difference between the initial position of the media content item and the current playback position of the media content item.

19. The first electronic device of claim 13, wherein at least a portion of the data received from the media-providing service is received from the second electronic device.

20. A non-transitory computer-readable storage medium storing instructions for execution by a first electronic device associated with a media-providing service, the instructions including instructions for:
while a media content item provided by the media-providing service is emitted by a second electronic device that is remote from the first electronic device:
receiving, from the media-providing service, data that includes an audio stream that corresponds to the media content item;
detecting ambient sound that includes sound corresponding to the media content item emitted by the second electronic device; and
generating a cleaned version of the ambient sound, including:
using the data received from the media-providing service to align the audio stream with the ambient sound; and
performing a subtraction operation to subtract the audio stream from the ambient sound; and
detecting a voice command in the cleaned version of the ambient sound.

\* \* \* \* \*

UNITED STATES PATENT AND TRADEMARK OFFICE
CERTIFICATE OF CORRECTION

| | |
|---|---|
| PATENT NO. | : 11,551,678 B2 |
| APPLICATION NO. | : 17/375962 |
| DATED | : January 10, 2023 |
| INVENTOR(S) | : Bromand et al. |

It is certified that error appears in the above-identified patent and that said Letters Patent is hereby corrected as shown below:

On the Title Page

Related U.S. Application Data (63), Line 2, please delete "Aug. 3, 2019," and insert --Aug. 30, 2019,--.

Signed and Sealed this
Second Day of January, 2024

Katherine Kelly Vidal
*Director of the United States Patent and Trademark Office*